United States Patent
Sugahara et al.

(10) Patent No.: US 9,949,144 B2
(45) Date of Patent: Apr. 17, 2018

(54) METHOD AND APPARATUS FOR CONTROLLING RADIO PARAMETERS, NETWORK OPERATION MANAGEMENT APPARATUS, AND RADIO BASE STATION

(71) Applicant: NEC Corporation, Tokyo (JP)

(72) Inventors: Hiroto Sugahara, Tokyo (JP); Hisashi Futaki, Tokyo (JP); Kosei Kobayashi, Tokyo (JP); Takamichi Inoue, Tokyo (JP)

(73) Assignee: NEC Corporation, Tokyo (JP)

(*) Notice: Subject to any disclaimer, the term of this patent is extended or adjusted under 35 U.S.C. 154(b) by 189 days.

(21) Appl. No.: 14/781,239

(22) PCT Filed: Mar. 28, 2014

(86) PCT No.: PCT/JP2014/001843
§ 371 (c)(1),
(2) Date: Sep. 29, 2015

(87) PCT Pub. No.: WO2014/162711
PCT Pub. Date: Oct. 9, 2014

(65) Prior Publication Data
US 2016/0057634 A1   Feb. 25, 2016

(30) Foreign Application Priority Data
Apr. 1, 2013 (JP) .................. 2013-076151

(51) Int. Cl.
*H04L 1/00* (2006.01)
*H04W 24/02* (2009.01)
(Continued)

(52) U.S. Cl.
CPC ........... *H04W 24/02* (2013.01); *H04W 16/22* (2013.01); *H04W 24/10* (2013.01)

(58) Field of Classification Search
None
See application file for complete search history.

(56) References Cited

U.S. PATENT DOCUMENTS 7,127,213 B2 * 10/2006 Haymes ............... H04W 24/00
                                              342/357.31
9,338,747 B1 * 5/2016 Parthasarathy ... H04W 52/0245
(Continued)

FOREIGN PATENT DOCUMENTS

JP     2004/013840      1/2004
WO  WO-2005/013632 A1   2/2005
(Continued)

OTHER PUBLICATIONS

International Search Report Corresponding to PCT/JP2014/001843, 5 pages, dated Jun. 24, 2014.
(Continued)

*Primary Examiner* — Phirin Sam
(74) *Attorney, Agent, or Firm* — Wilmer Cutler Pickering Hale and Dorr LLP

(57) ABSTRACT

A method and an apparatus for controlling a radio parameter, as well as a network operation management apparatus and a radio base station, are provided that enable optimization control taking a dead zone into consideration. A radio parameter control apparatus (10) for controlling a radio parameter of a radio base station (20) includes a measured data analysis section (101) that analyzes data measured by a plurality of radio terminals including a radio terminal in idle state to detect a dead zone in a radio cell, and a radio parameter control section (102) that controls the radio parameter of the radio base station based on information regarding the dead zone.

25 Claims, 13 Drawing Sheets

FIRST EXEMPLARY EMBODIMENT

(51) Int. Cl.
*H04W 16/22* (2009.01)
*H04W 24/10* (2009.01)

(56) References Cited

U.S. PATENT DOCUMENTS

| | | | |
|---|---|---|---|
| 2005/0020284 A1* | 1/2005 | Benco | H04W 16/18 |
| | | | 455/456.6 |
| 2005/0163047 A1* | 7/2005 | McGregor | H04W 24/00 |
| | | | 370/229 |
| 2005/0250542 A1 | 11/2005 | Aoyama et al. | |
| 2008/0137556 A1* | 6/2008 | Park | H04L 29/12264 |
| | | | 370/255 |
| 2013/0023300 A1* | 1/2013 | Tani | H04W 52/16 |
| | | | 455/522 |
| 2013/0090128 A1* | 4/2013 | Sawamoto | H04W 24/02 |
| | | | 455/452.2 |
| 2013/0157680 A1* | 6/2013 | Morita | H04W 52/244 |
| | | | 455/452.2 |
| 2013/0196650 A1 | 8/2013 | Futaki | |
| 2014/0200038 A1* | 7/2014 | Rao | H04L 67/2847 |
| | | | 455/457 |
| 2015/0257076 A1* | 9/2015 | Macwan | H04W 4/00 |
| | | | 455/436 |

FOREIGN PATENT DOCUMENTS

| | | |
|---|---|---|
| WO | WO-2011/081122 A1 | 7/2011 |
| WO | WO-2012/043796 A1 | 4/2012 |

OTHER PUBLICATIONS

3GPP TS 36.300 V10.5.0 (Sep. 2011), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), 194 pages.

3GPP TR 36.902 V9.3.0 (Dec. 2012), 3rd Generation Partnership Project; Technical Specification Group Radio Access Network; Evolved Universal Terrestrial Radio Access Network (E-UTRAN); Self-configuring and self-optimizing network (SON) use cases and solutions (Release 9), 21 pages.

* cited by examiner

FIRST EXEMPLARY EMBODIMENT

FIG. 3

MEASURED DATA STORAGE SECTION 11

| MEASURE-MENT LOCATION | MEASURE-MENT TIME | RAT 1 | FRE-QUENCY 1 | CELL 1 | RECEIVED POWER 1 | RECEIVED QUALITY 1 | ... | RAT m | FRE-QUENCY m | CELL m | RECEIVED POWER m | RECEIVED QUALITY m |
|---|---|---|---|---|---|---|---|---|---|---|---|---|
| L1 | T1 | R11 | F11 | C11 | P11 | Q11 | ... | Rm1 | Fm1 | Cm1 | Pm1 | Qm1 |
| L2 | T2 | R12 | F12 | C12 | P12 | Q12 | ... | Rm2 | Fm2 | Cm2 | Pm2 | Qm2 |
| ... | ... | ... | ... | ... | ... | ... | | ... | ... | ... | ... | ... |
| Ln | Pn | R1n | F1n | C1n | P1n | Q1n | | Rmn | Fmn | Cmn | Pmn | Qmn |
| ... | ... | | | | | | | | | | | ... |

FIRST EXAMPLE

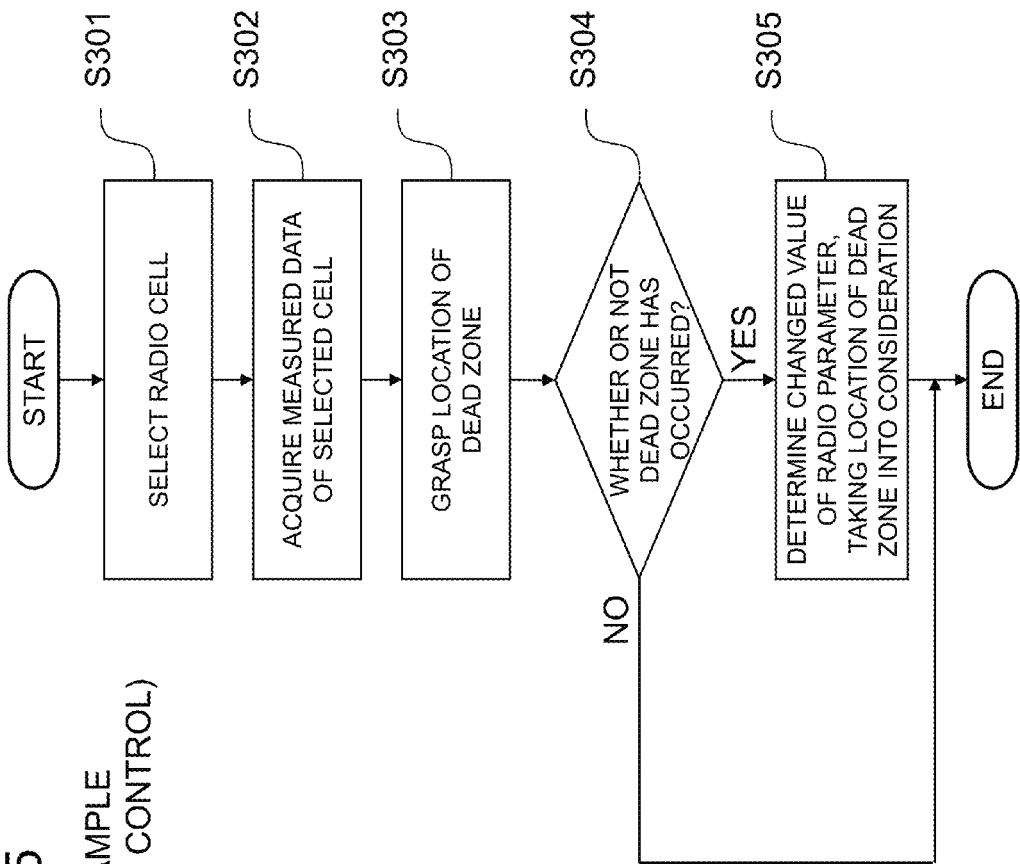

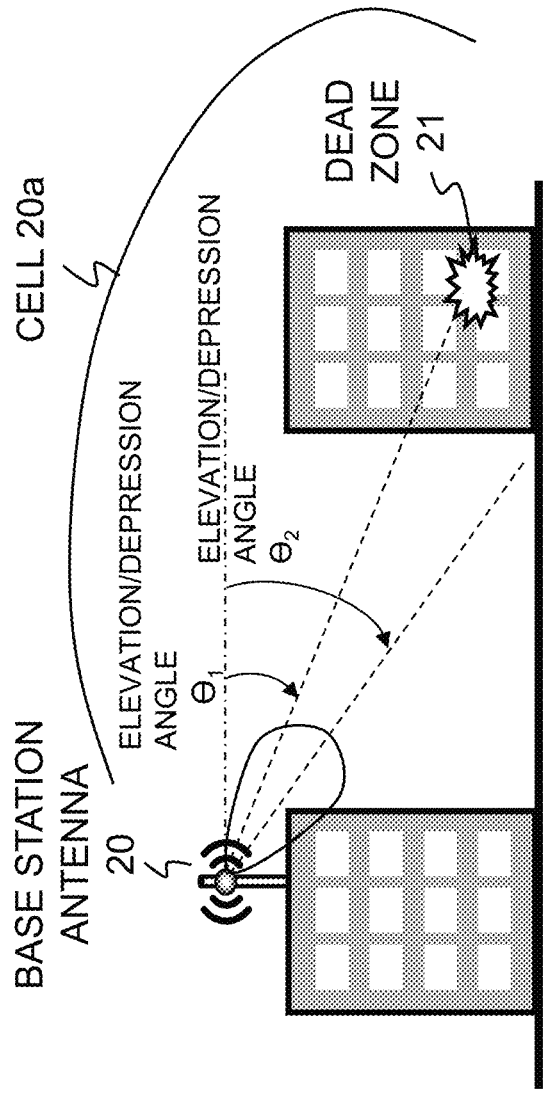

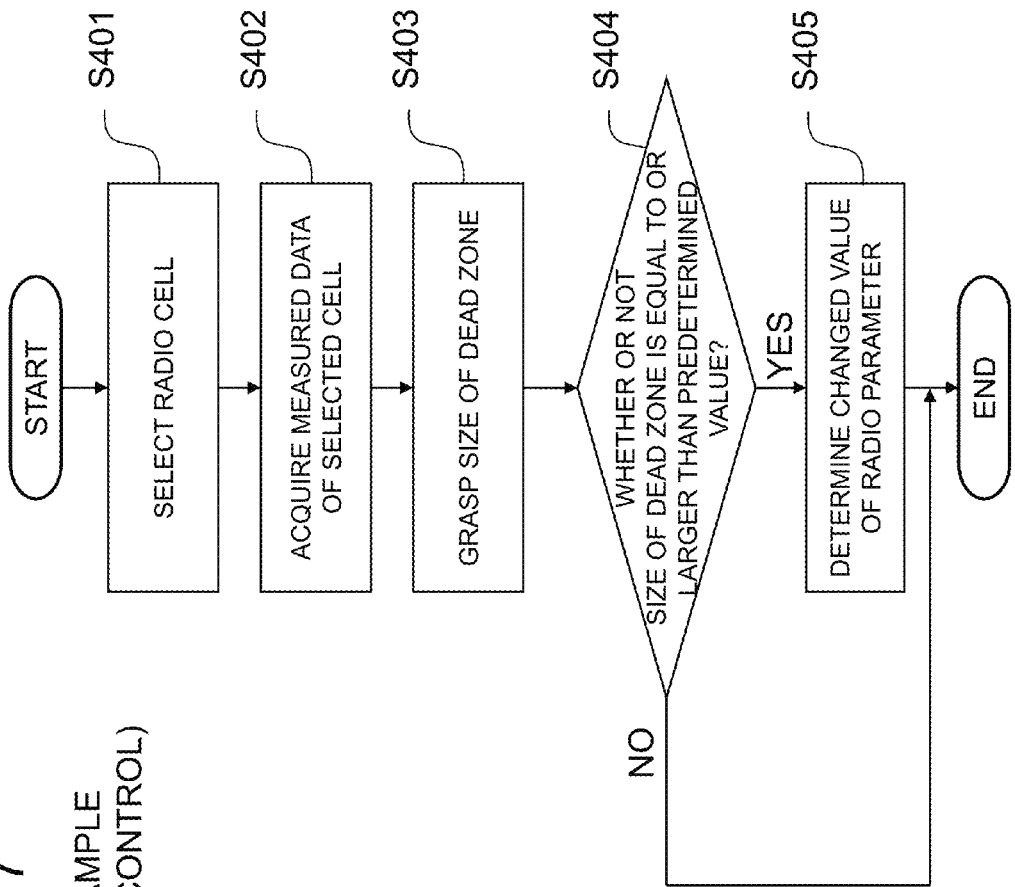

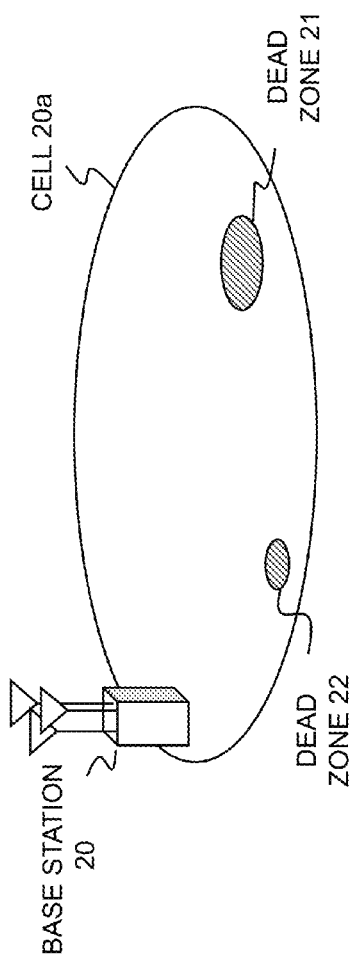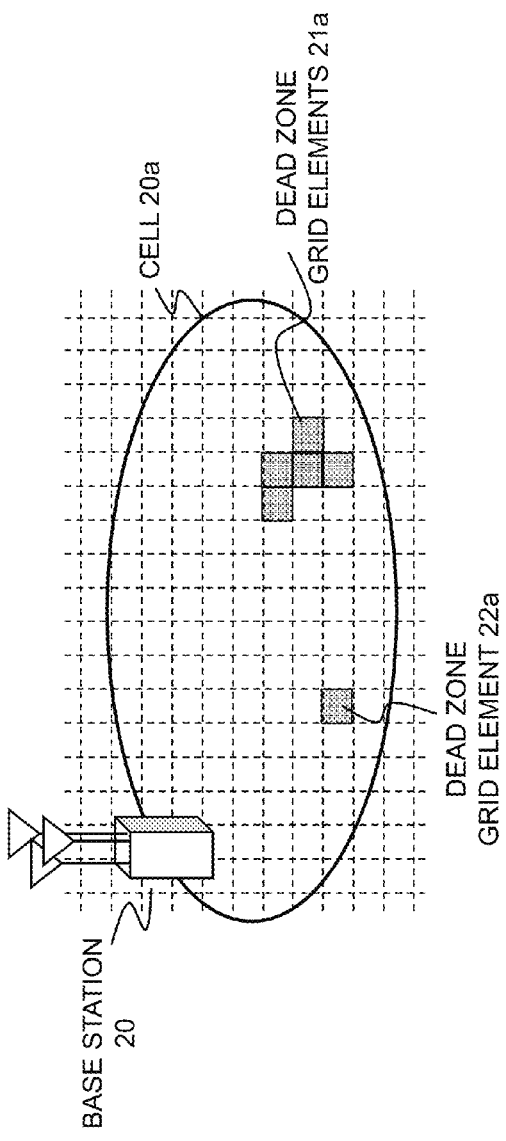

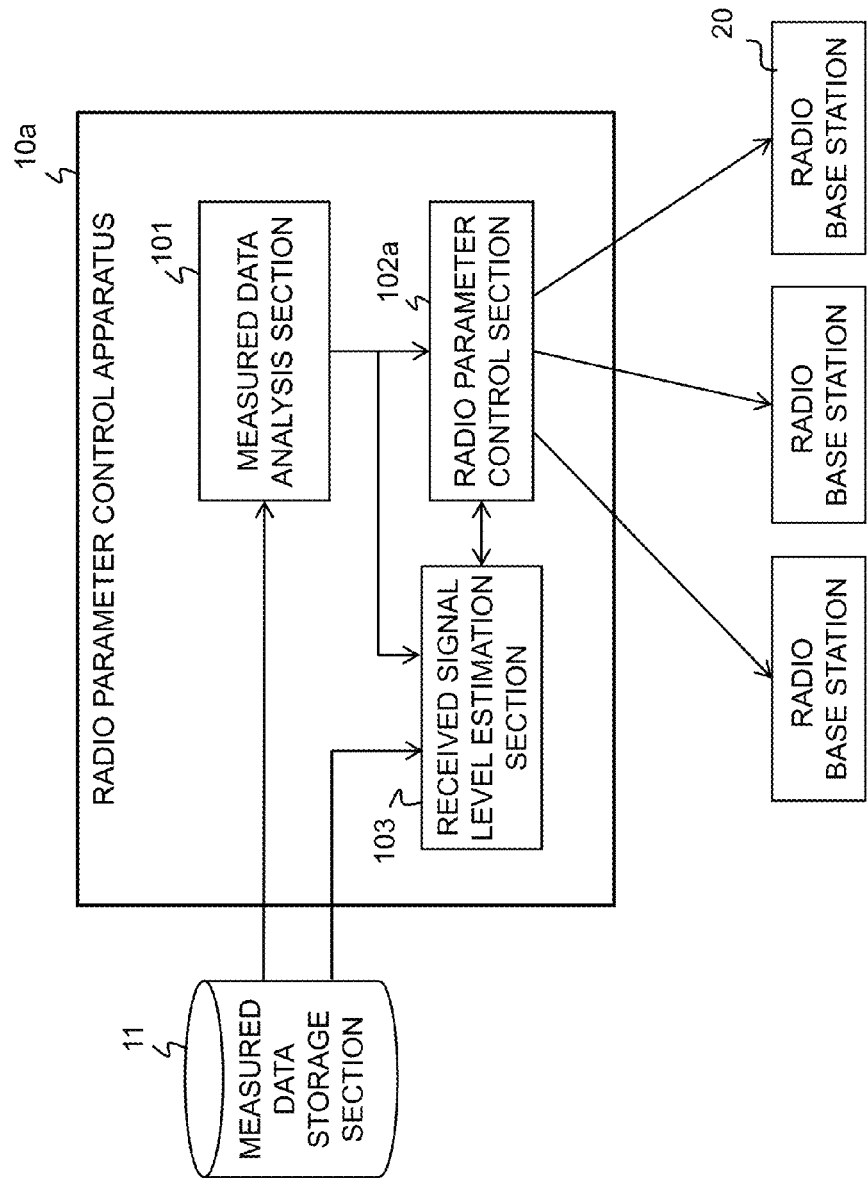

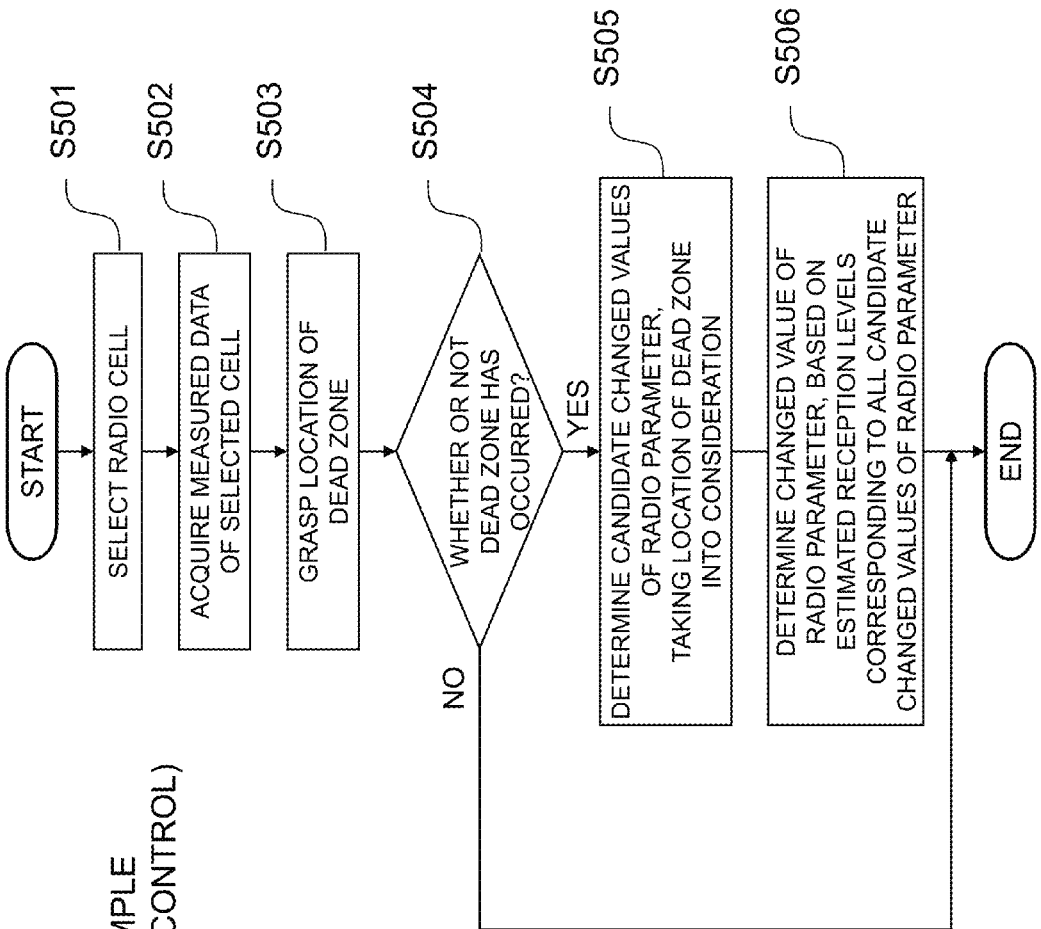

METHOD AND APPARATUS FOR CONTROLLING RADIO PARAMETERS, NETWORK OPERATION MANAGEMENT APPARATUS, AND RADIO BASE STATION

CROSS-REFERENCE TO RELATED APPLICATIONS

This application is a national stage application of International Application No. PCT/JP2014/001843 entitled "METHOD AND APPARATUS FOR CONTROLLING RADIO PARAMETERS, NETWORK OPERATION MANAGEMENT APPARATUS, AND RADIO BASE STATION," filed on Mar. 28, 2014, which claims the benefit of the priority of Japanese Patent Application No. 2013-076151, filed on Apr. 1, 2013, the disclosures of each of which are hereby incorporated by reference in their entirety.

TECHNICAL FIELD

The present invention relates to a wireless communication system and, more particularly, to a method and a device for controlling radio parameters of a base station, as well as to a network operation management apparatus and a radio base station.

BACKGROUND ART

In recent years, active studies have been conducted on SON (Self Organizing Network), which autonomously optimizes radio parameters and network configurations in wireless communication systems such as cellular systems, in view of operating expense (OPEX) reduction and the like. Standardization of SON functions is under way also in LTE (Long Term Evolution) of 3GPP ($3^{rd}$ Generation Partnership Project) (NPL 1).

SON includes functions such as:
Self-Configuration;
Self-Optimization;
Self-Healing.

These are technologies for accomplishing respective different objectives. Of them, Self-Optimization includes categories such as: optimization of cell coverage and capacity (Coverage and Capacity Optimization: CCO); optimization of handover parameters (Mobility Robustness Optimization: MRO); and optimization of load balancing (Mobility Load Balancing: MLB) (NPL 2).

In SON, a problem is recognized by using radio quality information reported from terminals and communication quality statistical information compiled by a base station, and a radio parameter of the base station is autonomously optimized so that the problem will be mended. For the information reported from terminals, those prescribed in 3GPP are used, but many of current studies on SON employ radio quality measured by terminals in wirelessly connected state (RRC Connected state).

On the other hand, 3GPP Release 10 newly prescribes MDT (Minimization of Drive Test) with the view of suppressing (minimizing) drive tests related to radio network operations management to the least extent possible. MDT prescribes an immediate reporting mode (Immediate MDT), in which a terminal in wirelessly connected state performs measurement and reporting, and a recording and reporting mode (Logged MDT), in which a terminal in idle state (RRC Idle state) records a measurement result and reports it when falling in wirelessly connected state. Moreover, information to be measured includes not only radio quality information but also a measuring terminal's location information (for example, information of GNSS (Global Navigation Satellite System) such as GPS (Global Positioning System)).

Accordingly, in SON, it is possible to optimize base station's parameters, based on radio quality information measured by terminals in immediate reporting mode or recording and reporting mode.

CITATION LIST

Non-Patent Literature

[NPL 1]
3GPP TS36.300 v10.5.0, section 22
(Internet <URL>http:www.3gpp.org/ftp/Specs/html-info/36300.htm)
[NPL 2]
3GPP TR36.902 v9.3.0
(Internet <URL>http:www.3gpp.org/ftp/Specs/html-info/36902.htm)

SUMMARY OF INVENTION

Technical Problem

However, there are a variety of environments in which base stations are installed, and the presence of obstacles such as high-rise buildings in a cell can create areas where radio waves hardly reach (dead zones). Even if cell optimization control is uniformly performed based on radio quality information without taking such dead zones into consideration, the dead zones are not always eliminated, with the result that cell optimization will not be accomplished in some cases.

Accordingly, an object of the present invention is to provide a method and an apparatus for controlling radio parameters, as well as a network operation management apparatus and a radio base station, which enable optimization control taking a dead zone into consideration.

Solution to Problem

A radio parameter control apparatus according to the present invention is a radio parameter control apparatus which controls a radio parameter of a radio base station, characterized by comprising: measured data analysis means that analyzes data measured by a plurality of radio terminals including a radio terminal in idle state and detects a dead zone in a radio cell controlled by the radio base station; and control means that controls the radio parameter of the radio base station, based on information regarding the dead zone.

A radio parameter control method according to the present invention is a method for controlling a radio parameter of a radio base station, characterized by comprising: by measured data analysis means, analyzing data measured by a plurality of radio terminals including a radio terminal in idle state and detecting a dead zone in a radio cell controlled by the radio base station; and by control means, controlling the radio parameter of the radio base station, based on information regarding the dead zone.

A network operation management apparatus according to the present invention is a network operation management apparatus managing a plurality of radio base stations, characterized by comprising: measured data analysis means that analyzes data measured by a plurality of radio terminals including a radio terminal in idle state under a radio base station and detects a dead zone in a radio cell controlled by the radio base station; and control means that controls a radio parameter of the radio base station, based on information regarding the dead zone.

A radio base station according to the present invention is a radio base station controlling a radio cell, characterized by comprising: measured data analysis means that analyzes data measured by a plurality of radio terminals including a radio terminal in idle state in the radio cell and detects a dead zone in the radio cell; and control means that controls a radio parameter of the own station, based on information regarding the dead zone.

Advantageous Effects of Invention

According to the present invention, a dead zone in a radio cell is detected by using data measured by a radio terminal in this cell, and a radio parameter of a base station is controlled based on information regarding the dead zone.

BRIEF DESCRIPTION OF DRAWINGS

FIG. 3 is a schematic diagram showing an example of a data structure in a measured data storage section in the present exemplary embodiment.

FIG. 5 is a flowchart showing a radio parameter control method according to a second example of the present invention.

FIG. 6 is a schematic diagram showing antenna projection directions for describing an example of location-based control in the second example.

FIG. 7 is a flowchart showing a radio parameter control method according to a third example of the present invention.

FIG. 8A is a schematic diagram showing a structure of a cell including dead zones, and FIG. 8B is a schematic diagram showing an example of representation of the dead zones for describing an example of size-based control in the third example.

FIG. 9 is a block diagram showing a functional configuration of a radio parameter control system according to a second exemplary embodiment of the present invention.

FIG. 10 is a flowchart showing a radio parameter control method according to a fourth example of the present invention.

DESCRIPTION OF EMBODIMENTS

According to an exemplary embodiment of the present invention, a dead zone in a cell is detected by using data measured by terminals that are moving in the cell, and a radio parameter of a base station is controlled based on information regarding the dead zone. Thus, it is possible to achieve optimization of base station's parameters with taking a dead zone into consideration. Hereinafter, exemplary embodiments and examples of the present invention will be described in detail by taking a wireless communication system shown in FIG. 1 as an example.

Figure 1:
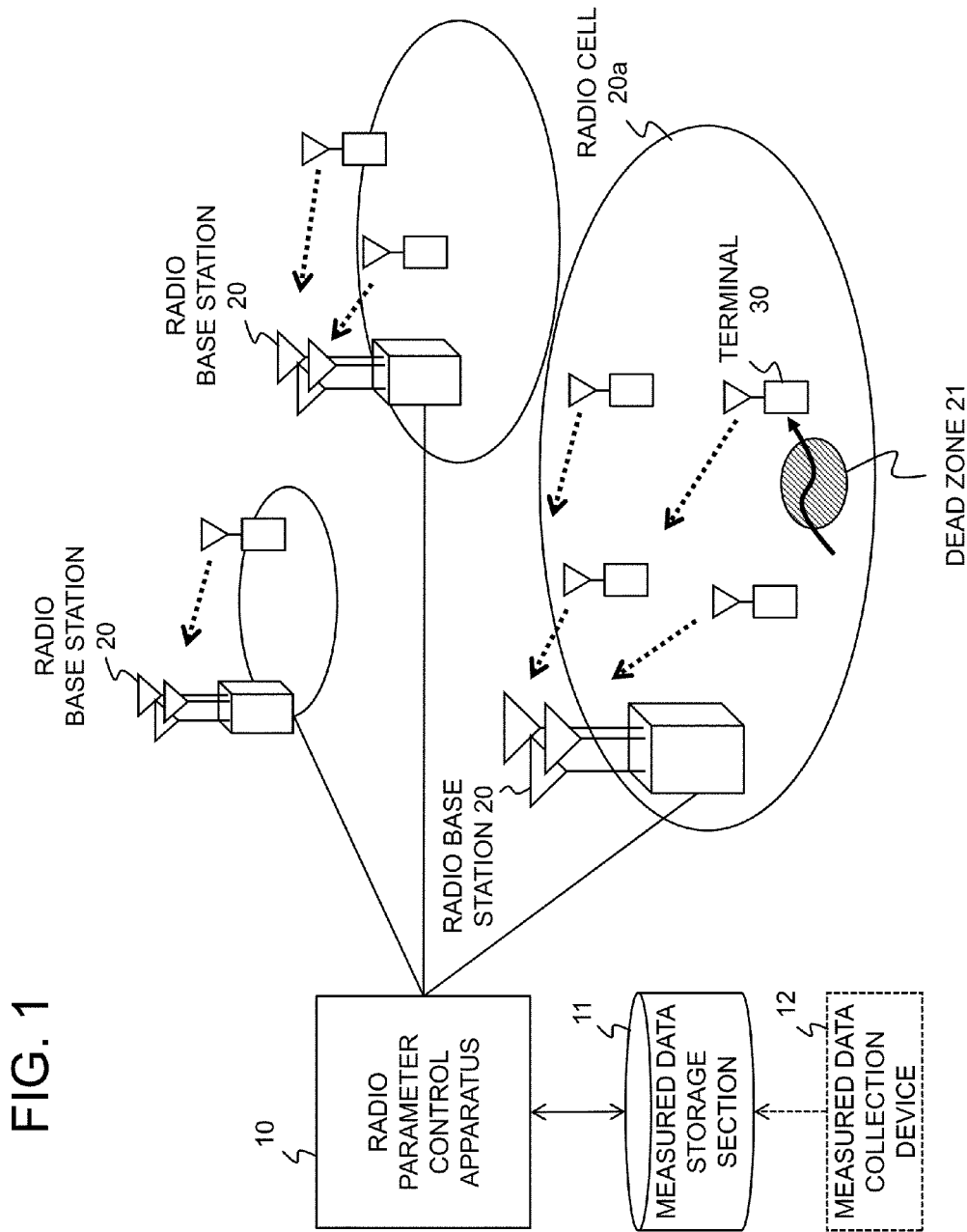
FIG. 1 is a network diagram showing a schematic architecture of a wireless communication system to which an exemplary embodiment of the present invention is applied.

Referring to FIG. 1, a radio parameter control apparatus 10 according to an exemplary embodiment of the present invention uses measured data stored in a measured data storage section 11 to determine an optimized radio parameter for each radio base station 20. Terminals in wirelessly connected state and in idle state are present in cells managed by the radio base stations 20. A terminal in connected state can report measured data to a radio base station concerned in immediate reporting mode (Immediate MDT), whereas a terminal in idle state can record measured data and, when it is wirelessly connected, report the measure data to a radio base station concerned in recording and reporting mode (Logged MDT). In the description below, it is assumed that a dead zone 21 exists in a cell 20a managed by a radio base station 20, and that a terminal 30 in idle state passes through the dead zone 21 and later reports data measured at that time (a record of a halt on acquisition of a measurement log) to the radio base station 20. Note that the plurality of radio cells shown in FIG. 1 may be adjacent to each other, or one radio cell may be a small cell configured within another radio cell. Moreover, the terminals are mobile stations, user equipment, or the like that are capable of wirelessly connecting to radio base stations, such as, for example, mobile telephones and mobile information terminals.

The measured data reported from each terminal as described above, as well as data measured by each radio base station, are collected by the radio parameter control apparatus 10 and stored in the measured data storage section 11. Alternatively, it is also possible that a measured data collection device 12, provided apart from the radio parameter control apparatus 10, collects measured data from each radio base station and stores them in the measured data storage section 11. Moreover, the measured data storage section 11 may be provided separately from the radio parameter control apparatus 10 or may be provided within the radio parameter control apparatus 10.

Furthermore, the radio parameter control apparatus 10 may be provided to a network operation management apparatus (not shown) that manages a plurality of radio base stations. Alternatively, it is also possible that a single network operation management apparatus or SON server includes the functions of the radio parameter control apparatus 10, the measured data storage section 11, and the measured data collection device 12. Alternatively, it is also possible that the radio parameter control apparatus 10 is provided to a radio base station 20 so that the radio base station 20 includes the radio parameter control function.

1. First Exemplary Embodiment

Figure 2:
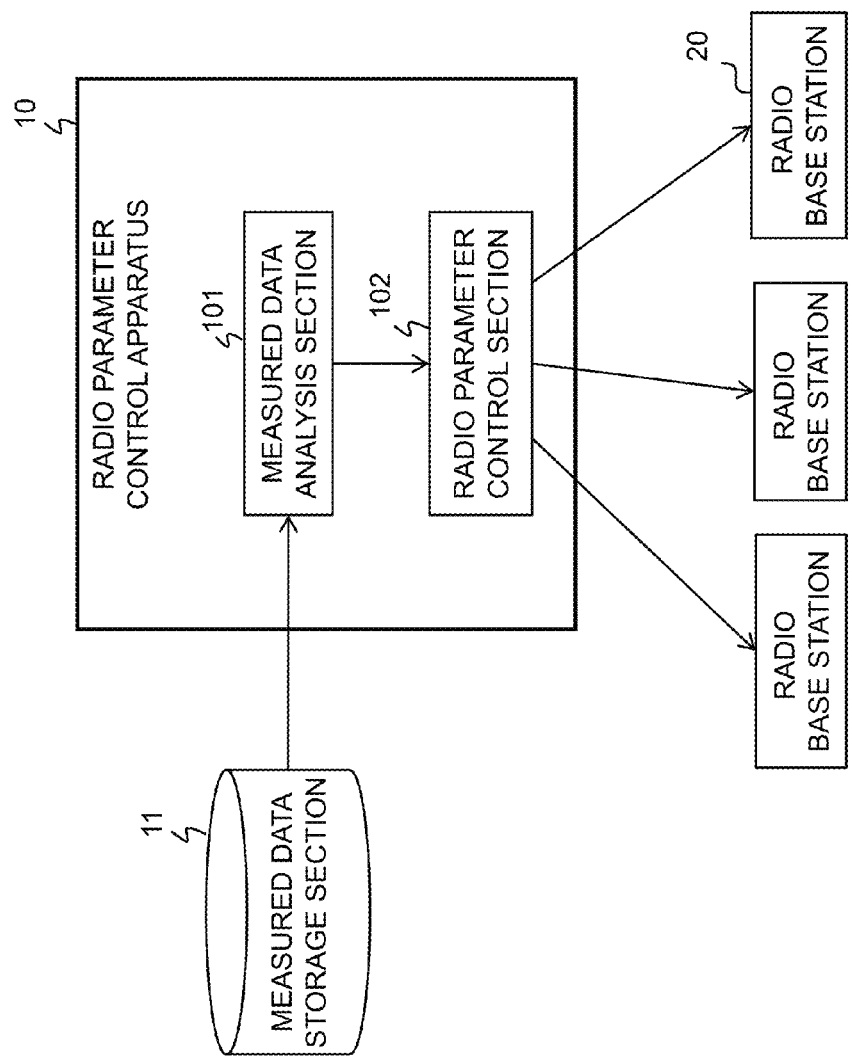
FIG. 2 is a block diagram showing a functional configuration of a radio parameter control system according to a first exemplary embodiment of the present invention.

Referring to FIG. 2, a radio parameter control apparatus 10 according to a first exemplary embodiment of the present invention includes a measured data analysis section 101 and a radio parameter control section 102 as functions. The measured data analysis section 101 acquires measured data of a selected cell from the measured data storage section 11 and analyzes it, and based on a result of this analysis, the radio parameter control section 102 controls a radio parameter in the cell concerned. Note that if the radio control apparatus 10 is provided with a computer (CPU: Central Processing Unit) and a storage device storing programs, it is also possible to implement functions similar to the above-described measured data analysis section 101 and radio parameter control section 102 by executing the programs on the computer.

<Measured Data>

FIG. 3 shows an example of the measured data. As illustrated in FIG. 3, the measured data storage section 11 stores data on measurement location and measurement time, along with radio cell, radio access system, frequency band, and received signal level (received power) and received quality of pilot signal (or reference signal) measured by a plurality of terminals.

The received signal level is, for example, RSRP (Reference Signal Received Power) in case of LTE, or RSCP (Received Signal Code Power) in case of UMTS. The received quality is the received signal quality of a pilot signal (or reference signal) and is, for example, RSRQ (Reference Signal Received Quality) in case of LTE, or Ec/No (the received energy per chip divided by the power density) in case of UMTS.

A measurement location is, for example, the latitude and longitude, or the x and y coordinates in the UTM (Universal Transverse Mercator) coordinate system or 19-coordinate system, and preferably further includes the z coordinate (altitude information). Moreover, it may also include information related to the liability of location information. As the information related to the liability of location information, a reliable segment or a degree of reliability may be cited.

When data on a measurement location of the received signal level as described above is unavailable, the location can be estimated by using information such as the received signal levels of pilot signals (or reference signals) for a plurality of radio cells, base station antenna locations in the radio cells, and the transmission signal levels of pilot signals (or reference signals). Specifically, a path loss between a base station antenna location and a terminal is calculated from a difference between the above-described transmission signal level and received signal level. Assuming that this path loss is proportional to the distance between the base station antenna location and the terminal, the location is specified by trilateration.

Moreover, when data on a measurement location is unavailable and a received signal level is unacquirable either, the location may be estimated by using location information measured at a measurement time different from the measurement of interest. For example, location information acquired immediately before the measurement of interest and location information acquired immediately after the measurement of interest are used, and their mean value is made to be the location where the measure of interest is performed.

Note that the measured data are not only those measured by terminals in connected state but also includes data measured by terminals in idle state. Measured data from terminals in idle state can be acquired by means of the recording and reporting mode functionality as described above.

<Measured Data Analysis and Parameter Control>

The measured data analysis section 101 detects the existence of a dead zone, a geographical feature or geographical features of a dead zone, and the like from the above-described measured data, and based on a result of this analysis, the radio parameter control section 102 controls a radio parameter (for example, transmission power, antenna tilt angle, or antenna beam angle such as horizontal beam angle) in the cell of interest. Here, the geographical feature of a dead zone is, specifically, the location, size, and the like of a dead zone. Further, the size of a dead zone is represented by a temporal ratio (the proportion of the duration of a stay in the dead zone to the period of measurement) or a locational ratio (the proportion of the dead zone to the entire area).

Hereinafter, the identification of a dead zone (first example), the detection of the location of a dead zone (second example), and the detection of the size of a dead zone (third example) by the measured data analysis section 101, as well as radio parameter control based on results of such detections by the radio parameter control section 102, will be described in detail with reference to drawings.

1.1) First Example

In the radio parameter control apparatus 10 according to a first example of the present invention, the measured data analysis section 101 analyzes measured data and grasps the existence of a dead zone.

For example, if measured data in recording and reporting mode includes information indicating that acquisition of a measurement log is temporarily halted due to entry into a dead zone, the measured data analysis section 101 recognizes that the measurement location of this measured data includes a dead zone. In this case, a radio cell in which a pilot signal (or reference signal) immediately before entry into the dead zone or immediately after exit from the dead zone presents the highest received signal level, is recognized as a cell including the dead zone.

Alternatively, if measured data includes information to the effect that the received signal levels (or received signal quality) of pilot signals (or reference signals) for all radio cells are lower than a predetermined value, it is recognized that the measurement location of this measured data includes a dead zone. In this case as well, for each measurement, a radio cell in which a pilot signal (or reference signal) presents the highest received signal level is recognized as a cell where the dead zone has occurred.

The radio parameter control section 102 determines a changed value of the radio parameter, based on the dead zone grasped by the measured data analysis section 101. For example, when a dead zone has occurred in a radio cell, the radio parameter is controlled so that the transmission power in this radio cell will be increased or the antenna tilt angle will be moved in uptilt direction.

Figure 4:
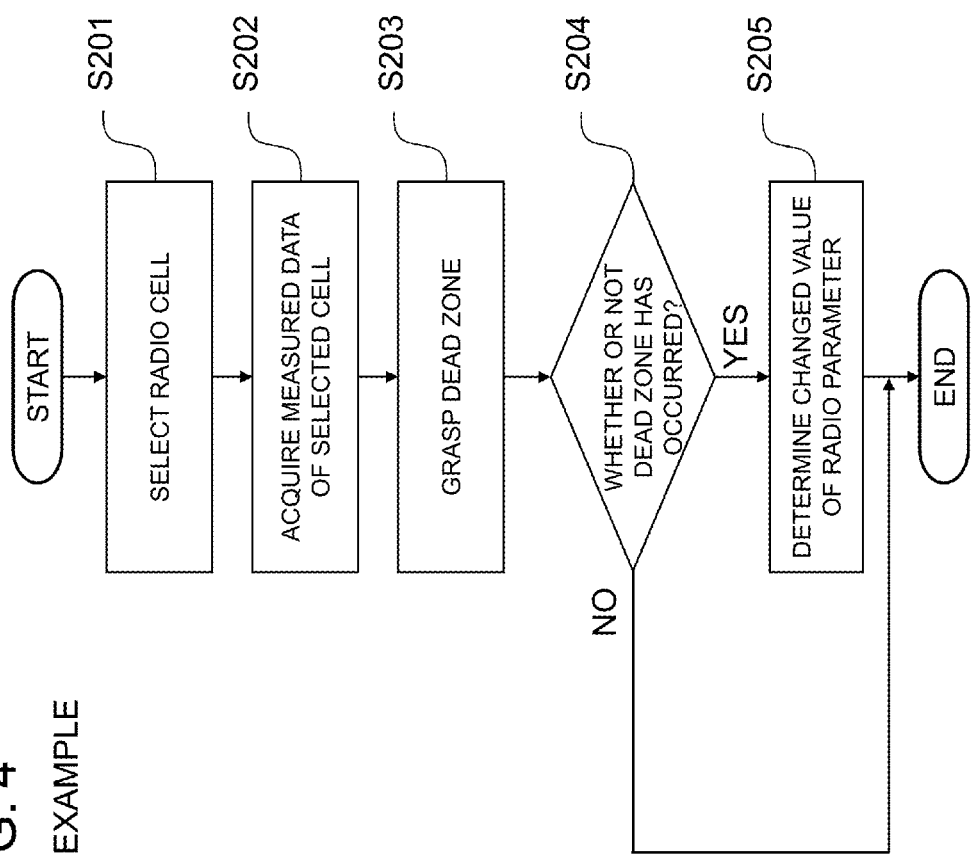
FIG. 4 is a flowchart showing a radio parameter control method according to a first example of the present invention.

Referring to FIG. 4, the radio parameter control apparatus 10 first selects a radio cell among radio cells under its control (Operation S201) and collects measured data measured in this radio cell as a serving cell, or measured data presenting that the received signal level of a pilot signal (or reference signal) in this radio cell is the highest (Operation S202). Note that measured data to be acquired may also include measured data measured before and after these measured data.

Subsequently, the measured data analysis section 101 analyzes the measured data as described above, thereby grasping the existence of a dead zone in this radio cell. If a dead zone has occurred (Operation S204; YES), the radio parameter control section 102 determines a changed value of the radio parameter such that the dead zone will be eliminated (Operation S205). Specifically, for example, the transmission power in this radio cell is increased or the antenna tilt angle is uptilted. If there is no dead zone (Operation S204; NO), the processing is completed.

1.2) Second Example

In the radio parameter control apparatus 10 according to a second example of the present invention, the measured data analysis section 101 analyzes measured data and grasps the location of a dead zone.

Referring to FIG. 5, the radio parameter control apparatus 10 acquires measured data with respect to a selected cell (Operations S301 and S302) as in the above-described Operations S201 and S202 in FIG. 4, and subsequently the measured data analysis section 101 analyzes the measure data, thereby grasping the location of a dead zone in this cell (Operation S303). Specifically, location information included in the measured data is used. If a dead zone has a wide range, for example, its barycenter is used for a representative point.

Subsequently, if a dead zone has occurred (Operation S304; YES), the radio parameter control section 102, taking the location of the dead zone into consideration, determines a changed value of the radio parameter such that the dead zone will be eliminated (Operation S305). For example, the antenna tilt angle and/or horizontal beam angle of a base station antenna is controlled so that the main axis of the base station antenna will face toward the dead zone. This antenna beam angle control will be described.

<Antenna Beam Angle Control>

Referring to FIG. 6, a direction from a base station antenna 20 of a radio cell 20a toward a dead zone 21 (an elevation/depression angle $\theta_1$) is calculated by using the following equation:

$$\theta_1 = \tan^{-1}\left(\frac{z_{BS} - z_{DS}}{\sqrt{(x_{BS} - x_{DS})^2 - (y_{BS} - y_{DS})^2}}\right) \quad [\text{Math. 1}]$$

where ($X_{BS}$, $Y_{BS}$, $Z_{BS}$) is the location of the base station antenna, and ($x_{DS}$, $Y_{DS}$, $Z_{DS}$) is the location of the dead zone. Note that in the horizontal direction, the x-axial direction (East) is positive with the y-axial direction (North) being 0 degree, whereas in the vertical direction, the downward direction is positive with the horizon being 0 degree.

Assuming that $\theta_2$ is a current antenna tilt angle (an elevation/depression angle) (which is an angle in vertical direction maximizing the antenna gain), uptilting is performed if $\theta_1 < \theta_2$, but downtilting is performed if $\theta_1 > \theta_2$.

1.3) Third Example

In the radio parameter control apparatus 10 according to a third example of the present invention, the measured data analysis section 101 analyzes measured data and grasps the size of a dead zone.

Referring to FIG. 7, the radio parameter control apparatus 10 acquires measured data with respect to a selected cell (Operations S401 and S402) as in the above-described Operations S201 and S202 in FIG. 4, and subsequently the measured data analysis section 101 analyzes the measure data, thereby grasping the size of a dead zone in this cell (Operation S403). The size of a dead zone can be grasped as, for example, a temporal ratio (the proportion of the duration of a stay in the dead zone to the period of measurement) or a locational ratio (the proportion of the dead zone to the entire area).

Subsequently, it is determined whether or not the size of the dead zone is equal to or larger than a predetermined value (Operation S404). If the size of the dead zone is equal to or larger than the predetermined value (Operation S404; YES), a changed value of the radio parameter is determined such that the dead zone will be eliminated (Operation S405) as in the first example. Specifically, for example, the transmission power in this radio cell is increased or the antenna tilt angle is uptilted. If there is no dead zone (Operation S404; NO), the processing is completed.

Note that it is also possible to combine the location-based control according to the second example and the size-based control according to the third example to perform radio parameter control.

<Grasp of Size of Dead Zone Based on Temporal Ratio>

In case where the size of a dead zone is grasped based on its temporal ratio, the measured data analysis section 101 uses time information in the measured data to obtain a duration during which a measuring terminal stays in the dead zone (a dead zone period) and subsequently calculates the length of the dead zone period relative to the whole period of measurement to obtain the temporal ratio of the dead zone, thus making it an indicator of the size of the dead zone.

<Grasp of Size of Dead Zone Based on Locational Ratio>

It is assumed that dead zones 21 and 22 exist in an actual cell 20a shown in FIG. 8A. Moreover, in case where the size of a dead zone is grasped based on its locational ratio, the measured data analysis section 101 divides an area covered by the radio cell 20a into a grid as shown in FIG. 8B and finds a predetermined number (or proportion) or more of grid elements where the dead zone 21 occurs. If the dead zones 21 and 22 exist in the actual cell 20a shown in FIG. 8A, their corresponding dead zone grid elements 21a and 22a can be specified as shown in FIG. 8B. Accordingly, the respective numbers of the dead zone grid elements 21a and 22a relative to the number of grid elements in the whole area of the radio cell 20a can be obtained as the sizes (locational ratios) of the dead zones.

1.4) Effects

As described above, according to the first to third examples of the present invention, the existence of a dead zone, a geographical feature or geographical features of a dead zone, and the like are detected from data measured by terminals, and a radio parameter (transmission power, antenna beam angle, or the like) in a cell of interest is controlled based on a result of this analysis, whereby it is possible to effectively eliminate the dead zone.

2. Second Exemplary Embodiment

Referring to FIG. 9, a radio parameter control apparatus 10a according to a second exemplary embodiment of the present invention includes functions of a measured data analysis section 101, a radio parameter control section 102a, and a received signal level estimation section 103. The measured data analysis section 101 is similar to that of the first exemplary embodiment shown in FIG. 1, and therefore a description thereof will be omitted.

The received signal level estimation section 103 has a function of estimating a received signal level after a radio parameter in a radio cell is changed and, specifically, estimates a received signal level in a dead zone after a radio parameter is changed. The radio parameter control section 102a generates candidate changed values of the radio parameter in this cell based on a result of analysis by the measured data analysis section 101 and determines a changed value of the radio parameter by referring to the estimated received signal levels in the dead zone after the parameter is changed, which are estimated by the received signal level estimation section 103.

Hereinafter, assuming that the measured data analysis section 101 identifies a dead zone (first example) and/or detects the location of the dead zone (second example), a description will be given of radio parameter control (fourth example) by the radio parameter control section 102a based on results of such detections, with reference to drawings.

2.1) Fourth Example

Referring to FIG. 10, the radio parameter control apparatus 10a according to a fourth example of the present invention acquires measured data with respect to a selected radio cell (Operations S501 and S502), and subsequently the measured data analysis section 101 analyzes the measured data, thereby grasping the location of a dead zone in this cell (Operation S503), as in the above-described Operations S301 to S303 in FIG. 5.

Subsequently, if a dead zone has occurred (Operation S504; YES), the radio parameter control section 102a, taking the location of the dead zone into consideration, determines candidate changed values of a radio parameter (Operation S505). For example, candidate values of the antenna tilt angle and/or horizontal beam angle of a base station antenna are determined such that the main axis of the base station antenna will face toward the dead zone. These candidate values are given to the received signal level estimation section 103.

The received signal level estimation section 103 estimates a received signal level in the dead zone in case of applying a candidate changed value of the radio parameter by using the location information on the dead zone detected by the measured data analysis section 101 and the candidate changed values of the radio parameter, in the following manner.

Assuming that RSRP_0 is a received signal level in the dead zone before the radio parameter is changed, then a received signal level RSRP_1 in this dead zone achieved when transmission power is changed from current P_0 to P_1, can be estimated by using the following equation, on the supposition that the received signal level varies by a change in transmission power.

RSRP_1=RSRP_0+(P_1−P_0)

Based on estimated values of the received signal level corresponding to all of the candidate changed values of the radio parameter, the radio parameter control section 102a decides on, as an ultimate changed value, a candidate changed value of the radio parameter that will most eliminate the dead zone (Operation S506). Note that if it has turned out as a result of the received signal level estimation that the dead zone of interest will not be eliminated (i.e., none of the candidate changed values make the receive signal level in the dead zone achieve a predetermined value), the radio parameter does not need to be changed. Next, a description will be given of a method for deciding on a changed value of the radio parameter, taking the setting of an antenna beam tilt angle as an example.

First, for a candidate change i of the radio parameter (antenna beam setting), it is assumed that RSRPn_i is an estimated value of the received signal level corresponding to this change of the antenna beam setting, with respect to a measured datum n of measured data measured in a predetermined cell for a predetermined period of time. In this case, an average received signal level with respect to all measured data measured in the predetermined cell for the predetermined period of time can be obtained as the following expression.

$$\frac{1}{N}\sum_{n=1}^{N} \text{RSRPn\_i} \qquad \text{[Math. 2]}$$

Assuming the value of this expression to be an indicator, a candidate change that yields the largest indicator among indicators for all candidate changes is decided on as a changed value of the antenna beam setting. A description will be given by using a simplified example shown in FIG. 11.

Figure 11:
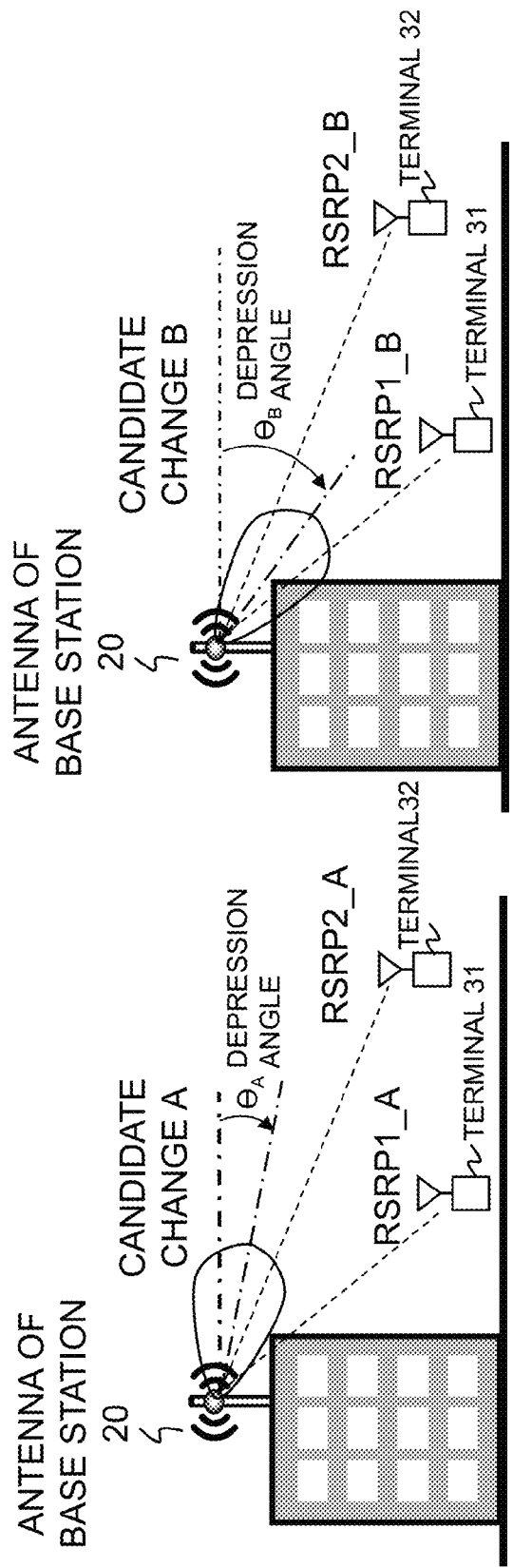
FIG. 11 is a schematic diagram showing an example of a method for determining a changed value of a radio parameter in the fourth example of the present invention.

Referring to FIG. 11, it is assumed that a base station 20 has predetermined antenna gain patterns, and that terminals 31 and 32 are present at respective predetermined locations relative to an antenna of the base station 20. Moreover, it is assumed that $\theta_A$ is a depression angle of the antenna of the base station 20 in case of a candidate change A of the radio parameter, and that $\theta_B$ is a depression angle of the antenna of the base station 20 in case of a candidate change B of the radio parameter, wherein $\theta_A < \theta_B$.

In this case, according to the antenna gain patterns as shown in FIG. 11, when the candidate change A of the radio parameter is set, received power RSRP1_A of the terminal 31 is very small (i.e., a dead zone occurs), whereas received power RSRP2_A of the terminal 32 is sufficiently large, and when the candidate change B of the radio parameter is set, both received power RSRP1_B of the terminal 31 and received power RSRP2_B of the terminal 32 are good to some extent. Accordingly, in this case, calculation using indicators represented by the above-mentioned expression shows that the value of the indicator in case of the candidate change B of the radio parameter is larger than that of the candidate change A, as shown by the following inequality, and accordingly the candidate change B of the radio parameter can be decided on as a changed value.

$$\frac{1}{N}\sum_{n=1}^{N} \text{RSRPn\_A} < \frac{1}{N}\sum_{n=1}^{N} \text{RSRPn\_B} \qquad \text{[Math. 3]}$$

2.2) Effects

As described above, according to the fourth example of the present invention, the existence or absence of a dead zone, a geographical feature or geographical features of the dead zone, and the like are detected from data measured by terminals; candidate changes of a radio parameter in a cell of interest are calculated based on a result of this analysis; and respective received signal levels on the terminal side in case of setting the candidate changes are estimated, whereby a candidate change of the radio parameter that is the most effective in eliminating the dead zone can be decide on as a changed value. Thus, more effective elimination of a dead zone can be achieved.

2.3) Other Examples

Apart from the method of received signal level estimation used in the fourth example, a method of radio wave propagation estimation can also be used to estimate a received signal level achieved when a radio parameter in a radio cell is changed. Specifically, statistical approaches (such as Hana model, Sakagami model, and ITU-R P.1546) and deterministic approaches (such as a ray tracing method) can be used.

3. Third Exemplary Embodiment

Figure 12:
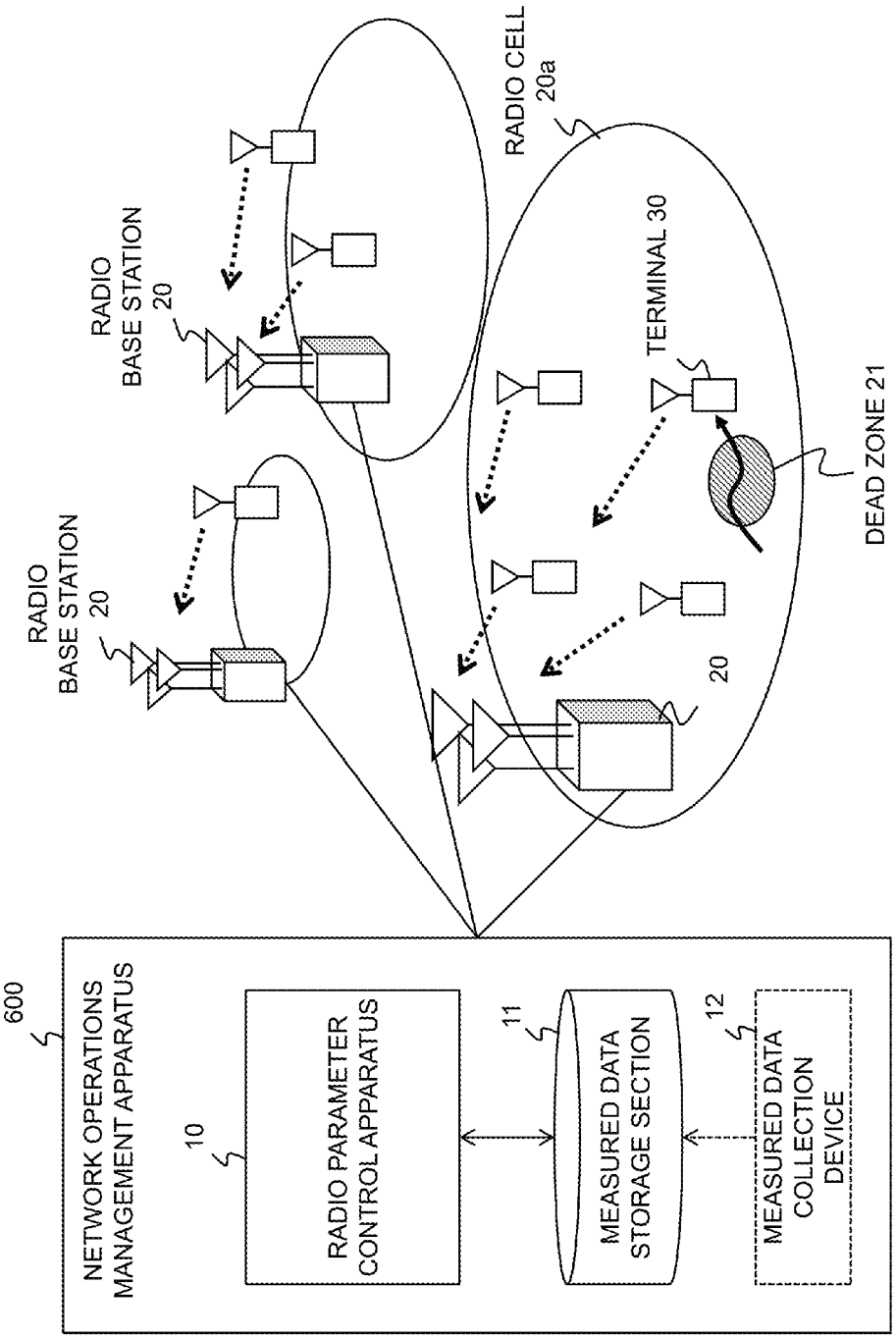
FIG. 12 is a block diagram showing a functional configuration of a network operation management apparatus according to a third exemplary embodiment of the present invention.

Referring to FIG. 12, a network operation management apparatus 600 managing radio base stations in a wireless communication system may include the above-described radio parameter control apparatus 10 or 10a, the measured data storage section 11, and further the measured data collection device 12. Basic operations are similar to the above-described first to fourth examples, and therefore a description thereof will be omitted.

4. Fourth Exemplary Embodiment

Figure 13:
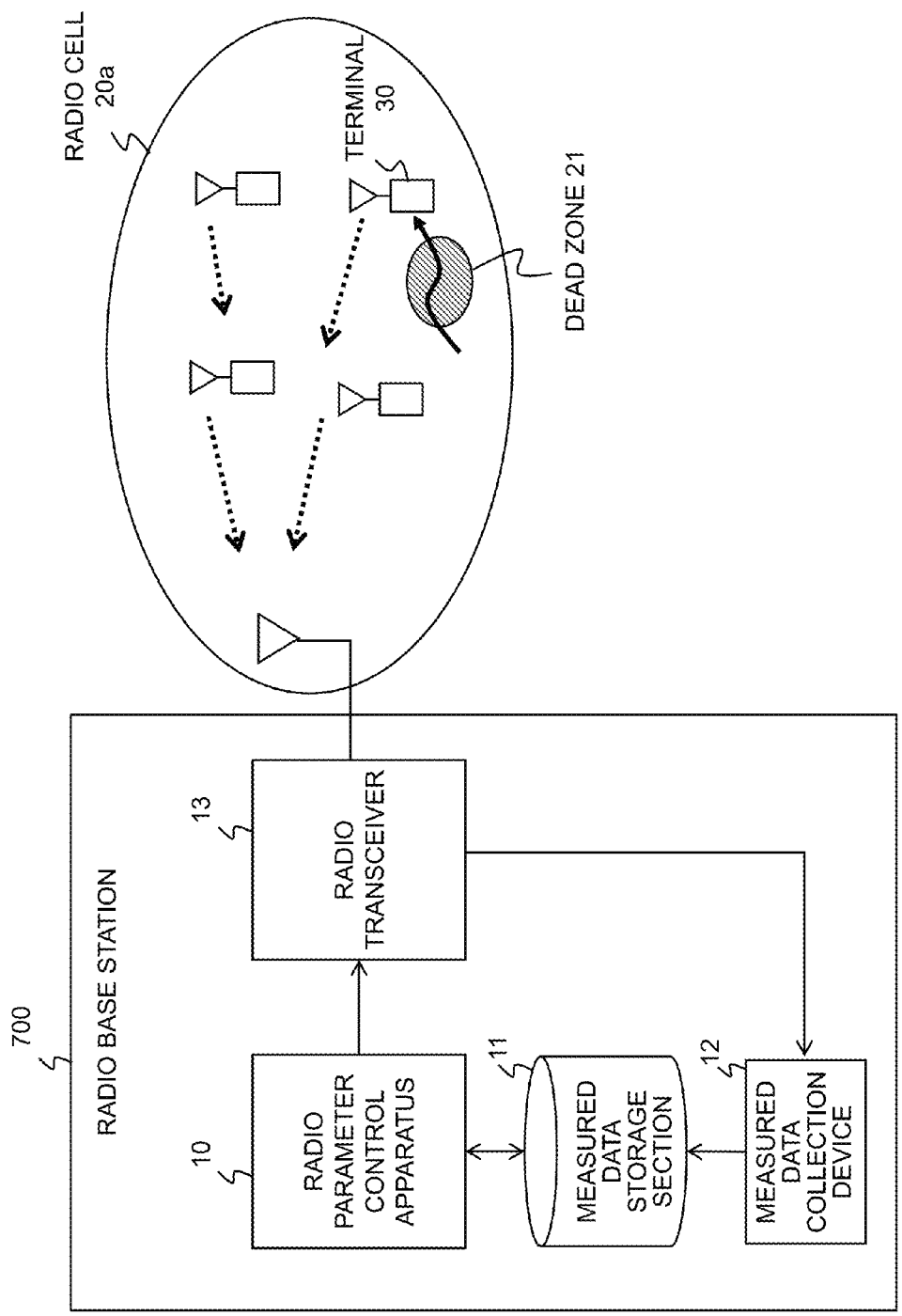
FIG. 13 is a block diagram showing a functional configuration of a radio base station according to a fourth exemplary embodiment of the present invention.

Referring to FIG. 13, a radio base station 700 in a wireless communication system may also include the above-described radio parameter control apparatus 10 or 10a, the measured data storage section 11, and further the measured data collection device 12, in addition to a radio transceiver 13 for wirelessly connecting to radio terminals. Basic operations are similar to the above-described first to fourth examples, and therefore a description thereof will be omitted.

INDUSTRIAL APPLICABILITY

The present invention is applicable to a system that controls a radio parameter of a radio station in a wireless communication system.

REFERENCE SIGNS LIST 10, 10a Radio parameter control device
11 Measured data storage section
12 Measured data collection device
20 Radio base station
20a Cell
21, 22 Dead zone
21a, 22a Dead zone grid element(s)
30, 31, 32 Terminal
101 Measured data analysis section
102 Radio parameter control section
103 Received signal level estimation section

The invention claimed is:

1. An apparatus for controlling a radio parameter of a radio base station, comprising:
a measured data analyzer that analyzes data measured by a plurality of radio terminals including a radio terminal in idle state to detect a dead zone in a radio cell controlled by the radio base station;
a controller that controls the radio parameter of the radio base station based on information regarding the dead zone; and
an estimator that estimates radio quality in the radio cell achieved when the radio parameter is changed,
wherein the controller generates at least one candidate changed value of the radio parameter based on the information regarding the dead zone,
the estimator estimates radio quality with respect to each of the candidate changed values of the radio parameter, and
the controller determines a changed value of the radio parameter based on the estimated radio qualities.

2. The apparatus according to claim 1, wherein the measured data analyzer detects a geographical feature of the dead zone by using the measured data.

3. The apparatus according to claim 2, wherein the geographical feature of the dead zone is at least any one of location information on the dead zone and a size of the dead zone.

4. The apparatus according to claim 3, wherein the location information on the dead zone is specified by using location information measured at a measurement time different from the measurement concerned.

5. The apparatus according to claim 3, wherein the size of the dead zone is a value based on a proportion of a duration during which the radio terminal stays in the dead zone to a period of measurement, or a value based on a proportion of the dead zone to the entire radio cell.

6. The apparatus according to claim 1, wherein the controller controls at least any one of transmission power of the radio base station and an antenna tilt angle thereof through the radio parameter.

7. A method for controlling a radio parameter of a radio base station, comprising:
analyzing data measured by a plurality of radio terminals including a radio terminal in idle state to detect a dead zone in a radio cell controlled by the radio base station;
controlling the radio parameter of the radio base station based on information regarding the dead zone;
generating at least one candidate changed value of the radio parameter based on information regarding the dead zone;
estimating radio quality with respect to each of the candidate changed values of the radio parameter; and
determining the changed value of the radio parameter based on the estimated radio qualities.

8. The method according to claim 7, further comprising:
detecting a geographical feature of the dead zone by using the measured data.

9. The method according to claim 8, wherein the geographical feature of the dead zone is at least any one of location information on the dead zone and a size of the dead zone.

10. The method according to claim 9, wherein the location information on the dead zone is specified by using location information measured at a measurement time different from the measurement concerned.

11. The method according to claim 9, wherein the size of the dead zone is a value based on a proportion of a duration for which the radio terminal stays in the dead zone to a period of measurement, or based on a proportion of the dead zone to the entire radio cell.

12. The method according to claim 7, further comprising:
t controlling at least any one of transmission power of the radio base station and an antenna tilt angle thereof through the radio parameter.

13. A network operation management apparatus managing a plurality of radio base stations, comprising:
a measured data analyzer that analyzes data measured by a plurality of radio terminals including a radio terminal in idle state under a radio base station to detect a dead zone in a radio cell controlled by the radio base station;
a controller that controls a radio parameter of the radio base station based on information regarding the dead zone; and
an estimator that estimates radio quality in the radio cell achieved when the radio parameter is changed, wherein the controller generates at least one candidate changed value of the radio parameter based on the information regarding the dead zone, the estimator estimates radio quality with respect to each of the candidate changed values of the radio parameter, and the controller determines the changed value of the radio parameter based on the estimated radio qualities.

14. The network operation management apparatus according to claim 13, wherein the measured data analyzer detects a geographical feature of the dead zone by using the measured data.

15. The network operation management apparatus according to claim 14, wherein the geographical feature of the dead zone is at least any one of location information on the dead zone and a size of the dead zone.

16. The network operation management apparatus according to claim 15, wherein the location information on the dead zone is specified by using location information measured at a measurement time different from the measurement concerned.

17. The network operation management apparatus according to claim 15, wherein the size of the dead zone is a value based on a proportion of a duration during which the radio terminal stays in the dead zone to a period of measurement, or a value based on a proportion of the dead zone to the entire radio cell.

18. The network operation management apparatus according to claim 13, wherein the controller controls at least any one of transmission power of the radio base station and an antenna tilt angle thereof through the radio parameter.

19. A radio base station controlling a radio cell, comprising:
a measured data analyzer that analyzes data measured by a plurality of radio terminals including a radio terminal in idle state in the radio cell to detect a dead zone in the radio cell;
a controller that controls a radio parameter of the own station, based on information regarding the dead zone; and
an estimator that estimates radio quality in the radio cell achieved when the radio parameter is changed,
wherein the controller generates at least one candidate changed value of the radio parameter based on the information regarding the dead zone,
the estimator estimates radio quality with respect to each of the candidate changed values of the radio parameter, and
the controller determines the changed value of the radio parameter based on the estimated radio qualities.

20. The radio base station according to claim 19, wherein the measured data analyzer detects a geographical feature of the dead zone by using the measured data.

21. The radio base station according to claim 20, wherein the geographical feature of the dead zone is at least any one of location information on the dead zone and a size of the dead zone.

22. The radio base station according to claim 21, wherein the location information on the dead zone is specified by using location information measured at a measurement time different from the measurement concerned.

23. The radio base station according to claim 21, wherein the size of the dead zone is a value based on a proportion of a duration during which the radio terminal stays in the dead zone to a period of measurement, or a value based on a proportion of the dead zone to the entire radio cell.

24. The radio base station according to claim 19, wherein the controller controls at least any one of transmission power of the radio base station and an antenna tilt angle thereof through the radio parameter.

25. A non-transitory computer readable medium storing a program causing a computer to function as a radio parameter control apparatus for controlling a radio parameter of a radio base station, the program causing the computer to implement:
a measured data analysis function that analyzes data measured by a plurality of radio terminals including a radio terminal in idle state to detect a dead zone in a radio cell controlled by the radio base station; and
a control function that controls the radio parameter of the radio base station based on information regarding the dead zone; and
an estimation function that estimates radio quality in the radio cell achieved when the radio parameter is changed,
wherein the control function generates at least one candidate changed value of the radio parameter based on the information regarding the dead zone,
the estimation function estimates radio quality with respect to each of the candidate changed values of the radio parameter, and
the control function determines the changed value of the radio parameter based on the estimated radio qualities.

* * * * *